Dec. 18, 1934.  L. E. LA BRIE  1,984,883
BRAKE
Filed Oct. 27, 1930   2 Sheets-Sheet 1

INVENTOR.
LUDGER E. LA BRIE
BY
ATTORNEY

INVENTOR.
LUDGER E. LABRIE
BY M.W. McConkey
ATTORNEY

Patented Dec. 18, 1934

1,984,883

UNITED STATES PATENT OFFICE 1,984,883

BRAKE

Ludger E. La Brie, South Bend, Ind., assignor to Bendix Brake Company, South Bend, Ind., a corporation of Illinois Application October 27, 1930, Serial No. 491,589

12 Claims. (Cl. 188—106)

This invention relates to brakes, and is illustrated as embodied in an internal expanding brake of the shiftable-anchorage type. An object of the invention is to provide a brake of this type with two independently-operable applying means, so that one can always be operated to apply the brake even if the other one fails. This is especially desirable where one applying means is operated by hydraulic or other fluid power, and especially when this is the case various features of the duplex applying means are useful with brakes not of the shiftable-anchorage type.

In the arrangement illustrated in the drawings, the auxiliary and preferably mechanical applying means includes two devices, one near each end of the friction means and which preferably include rollers or other thrust devices in rolling engagement with the friction means. These I consider it simplest to operate by attaching a tension cable or equivalent element to one of them, and operating the other by the reaction of a flexible "Bowden-type" conduit housing the cable.

Another feature of the invention, which is in some respects independent of the manner of brake application, relates to the anchorage of a brake of this type in a manner permitting the anchored shoe or its equivalent to shift somewhat radially to compensate for eccentricities of the drum and for other inaccuracies which are difficult to compensate by any fixed adjustment. Preferably one or both ends of the friction device anchors through the medium of pivoted links, shown as being in tension when taking the braking torque. To facilitate the shifting of the anchorage, the pivot connection at one end of the anchor links may be by means of a slot, or an equivalent lost-motion connection which will prevent interference on the part of the link on the unanchored end of the friction device.

Other features of the invention include a novel arrangement of the fluid-pressure applying means, several advantageous simple structures included in the brake positioning means and adjustments, and other novel and desirable constructions and arrangements, which will be apparent from the following description of the illustrative embodiment shown in the accompanying drawings, in which.

The illustrated brake includes a drum 10, at the open side of which is a suitable support such as a backing plate 12, and within which is arranged friction means preferably of the shiftable-anchorage type, i. e. friction means having one anchorage (preferably at or adjacent one end) when the drum is turning in one direction and having a different anchorage (preferably at or adjacent the other end) when the drum is turning in the opposite direction. The particular shiftable-anchorage friction means includes a pair of shoes 14 and 16 connected by an adjustable articulation or pivot joint 18.

Figure 3:
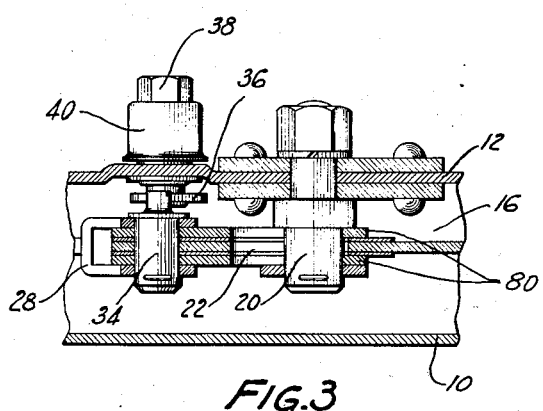
Figure 3 is a partial section on the line 3—3 of Figure 1, showing the connection from the fluid pressure means, and one of the anchor posts, and illustrating the novel linked anchorage.
Figure 4:
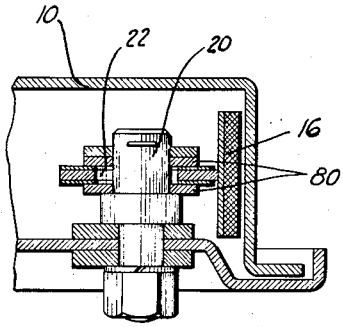
Figure 4 is a partial section on the line 4—4 of Figure 1, showing one of the brake anchor posts.

The particular brake illustrated has an anchorage, when the drum is turning clockwise, by engagement of the shoe 14 with a fixed anchor post 20 secured to the backing plate, which may be suitably reinforced as shown in Figures 3 and 4. Post 20 passes through an elongated slot 22 in the web of shoe 14, the web being also reinforced by welding steel stampings to its opposite sides. Similarly, when the drum is turning counterclockwise, shoe 16 anchors on a post 20 mounted as described above.

The fluid power applying means may include a hydraulic cylinder 24 secured to the backing plate between the shoes 14 and 16. Within this cylinder are a pair of pistons 26, engaging thrust parts 28 to force the shoes apart to apply the brake against the resistance of a return spring 30 tensioned between the shoes.

Auxiliary springs 32 urge the shoes upwardly against the anchor posts 20 when the brake is released. The angle of springs 32 is such as to insure that the toe of shoe 14 will engage the drum prior to full application of the brake, so that the drum friction will be holding the proper one of shoes 14 or 16 against its anchorage at the time the load comes on the brake, so that there is no shifting of the anchorage under load.

The thrust parts 28 are shown forked at their ends to embrace the ends of the shoes, and are connected to the shoes by means such as pivots 34, preferably engaged at their ends when the brake is released by positioning devices such as eccentrics 36.

Figure 5:
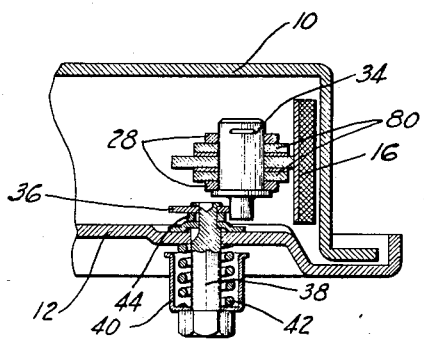
Figure 5 is a partial section on the line 5—5 of Figure 1, showing another positioning device.
Figure 7:
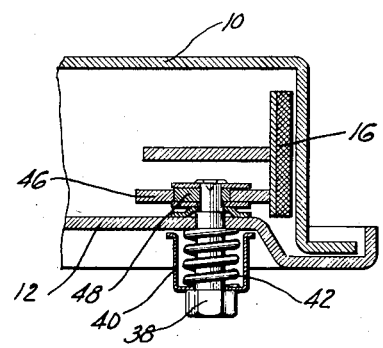
Figure 7 is a partial section on the line 7—7 of Figure 1, showing one of the positioning devices.
Figure 8:
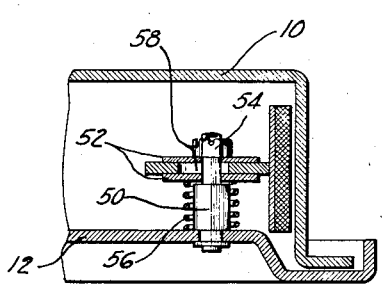
Figure 8 is a partial section on the line 8—8 of Figure 1, showing one of the brake steady rests.

As shown in Figure 5, I prefer, for convenience of adjustment, to provide eccentric 36 with a headed stem 38 passing through the backing plate, and which may have a cup-shaped stamped housing 40 held by its head, there being a coil compression spring 42 sleeved on stem 38 within the housing and confined between the backing plate and the housing 40. Spring 42 holds the eccentric, either directly or through the medium of a washer 44, frictionally against the backing plate, so that the eccentric will remain in any position of adjustment to which it is moved.

The brake may also have a positioning device such as a roller 46 engaging the inner face of the rim of shoe 16, and mounted on an eccentric 48 having a stem 38 held by a spring 42 as described above. It is also shown as having two steady rests each including a stud 50 riveted to the backing plate and carrying washers 52 embracing the shoe web between them and urged outwardly toward a nut or other stop 54 by a spring 56 sleeved on the stud and confined between the backing plate and the adjacent washer 52. Studs 50 pass freely through elongated slots 58 in the shoe webs.

Figure 1:
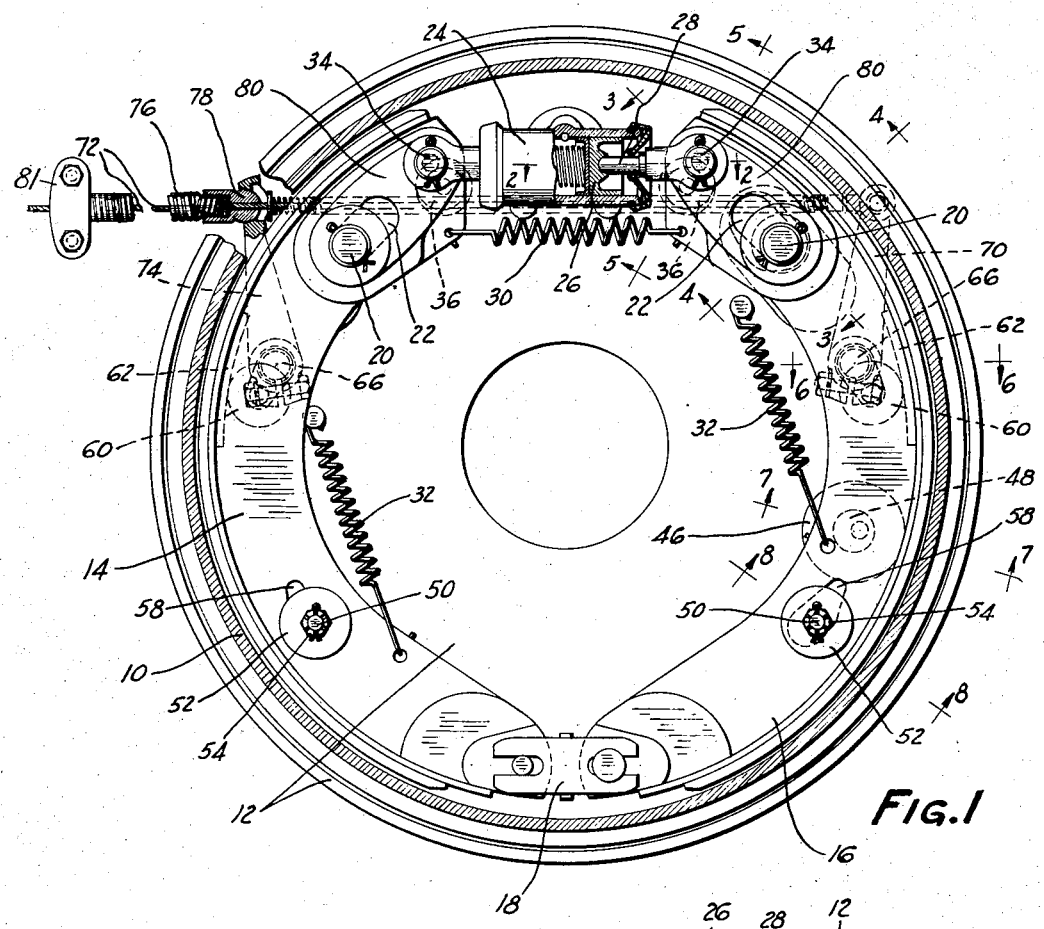
Figure 1 is a vertical section through the brake, just inside the head of the drum, showing the brake friction means in side elevation.
Figures 2, 6:
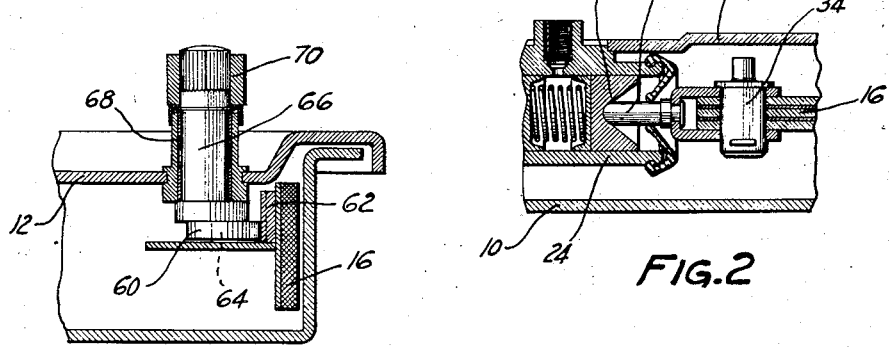
Figure 2 is a partial section on the line 2—2 of Figure 1, showing the mounting of the fluid-pressure applying means.
Figure 6 is a partial section on the line 6—6 of Figure 1, showing one of the mechanically-actuated applying devices.

Various important features of the invention relate to the auxiliary or emergency mechanical applying means. While various forms may be used, I prefer to provide a thrust roller or the like 60 in rolling engagement with each shoe, or with a hardened thrust plate 62 carried by each shoe. As shown in Figure 6, each of the rollers 60 may be mounted on an eccentric or crank pin 64 formed on an operating shaft 66 journaled in a bearing 68 carried by the backing plate.

In the arrangement which I prefer, partly on account of its simplicity, one shaft 66 has an operating lever 70 actuated by a flexible cable or other tension element 72 connected to and operated by the usual brake hookup on the chassis frame, while the other shaft 66 has an operating lever 74 actuated by the reaction thereon of a flexible Bowden-type housing 76 through which the cable 70 passes. Conduit 76 has at one end a fitting 78 making a ball-and-socket joint with the lever, while its other end is supported by a fitting 81 secured to the chassis frame. The conduit is shown as made up of a closely-wound wire covered by a cloth housing.

It will be seen that not only are the two controls independently operable, but that no matter which one is operated to apply the brake neither of them interferes with the shifting of the brake anchorage or with any other function of the brake.

An auxiliary feature of the invention relates to the details of the brake anchorage, more particularly to give a floating or radially-shiftable effect on the anchored shoe without interfering with the unanchored shoe. In the preferred arrangement illustrated, shoe 14 (or 16) does not anchor directly on its anchor post 20, but has connected thereto links 80 pivoted at one end to the shoe and at the other end to the anchor post 20, the connection at one end being of the pin-and-slot or some equivalent lost-motion type.

As shown, the links 80 are directly connected to the end of the shoe by the pivot 34 of the hydraulic applying means, and are slotted at their opposite ends to embrace the anchor post 20. The slot 22 in the shoe web, as shown in Figure 3, is slightly longer than the slots in links 80, so that the shoe does not anchor by direct engagement with the anchor post.

It will be seen that the friction device anchors by tensioning one or the other of the sets of links 80, while by the slotted engagement with posts 20 the links at the unanchored end in no way interfere with the application of the brake. The anchored end can shift radially slightly, to follow inaccuracies and eccentricities of the drum, without any wedging or binding effect which might tend to cause the brake to lock.

Some features of a linked anchorage of this type are described and claimed in prior application No. 381,195, filed July 26, 1929, by Humphrey F. Parker.

While one illustrative embodiment has been described in detail, it is not my intention to limit the scope of the invention to that particular embodiment, or otherwise than by the terms of the appended claims.

I claim:

1. Brake friction means having two independently-operable applying means, one of which comprises two devices of which one is operated by a tension element and the other of which is operated by the reaction of a flexible conduit housing said tension element.

2. Brake friction means having two independently-operable applying means, one of which is operated by fluid pressure and the other of which comprises two devices of which one is operated by a tension element and the other of which is operated by the reaction of a flexible conduit housing said tension element.

3. A brake of the shiftable-anchorage type having a thrust roller device in rolling engagement therewith near each end, in combination with a tension element operating one of said devices and a flexible conduit for the tension element operating the other of said devices by its reaction thereon.

4. A brake friction device having fluid power applying means including a piston with a thrust part connected to the friction device by a pivot, in combination with a positioning member engaged by said pivot when the brake is released.

5. A brake friction device having fluid power applying means including a piston with a thrust part connected to the friction device by a pivot, in combination with an eccentric engaged by said pivot when the brake is released.

6. A brake positioning device comprising, in combination with the brake backing plate, an eccentric having a headed stem extending through the backing plate and provided with a cup-shaped housing held by its head, and a compression spring sleeved on the stem and confined between the housing and backing plate and holding the eccentric frictionally against the backing plate.

7. A brake friction device having an anchor adjacent each end, and having an applying device acting on said ends, and provided with links connecting said ends to the anchors, said links being connected to said ends by means also connecting the applying device to said ends.

8. A brake friction device having at each end a link pivoted to said end and extending back along the shoe and having an elongated slot in the end of said link opposite to the end thereof which is pivoted to the friction device, in combination with an anchor passing through each of said slots.

9. A brake comprising a drum, a pair of friction shoes positioned within said drum, a link connected to one end of each of said shoes, means for anchoring said shoes upon the end of one link opposite to the end connected to its associated shoe when the drum is turning in one direction and upon the end of the other link opposite to the end connected to its associated shoe when the drum is turning in the opposite direction, and fluid power means positioned between said last named two ends for applying said shoes to said drum.

10. A brake comprising a drum, a friction device within said drum having separable ends, means comprising a pivoted linkage for anchoring said friction device on one of said ends when the drum is turning in one direction, means comprising a second pivoted linkage for anchoring said friction device on the other of said ends when the drum is turning in the opposite direction, an applying device acting directly on both of said ends, and a second applying device separate from said first named applying device.

11. A brake comprising a drum, a friction element having a hardened thrust element in said drum, a stationary support, and means for applying said friction element to said drum comprising a crank pin, a roller mounted on said pin and bearing on the associated thrust element, a lever operatively connected to said crank pin, and means for applying force to said lever.

12. A brake comprising a drum, a friction element having a pair of hardened thrust elements in said drum, a stationary support and means for applying said friction element to said drum comprising a pair of identical applying elements, each comprising a crank pin, a roller mounted on said pin and bearing on the associated thrust element, a lever operatively connected to said crank pin, and means for applying force to both of said levers simultaneously.

LUDGER E. LA BRIE.